Patented Aug. 22, 1950

2,519,751

UNITED STATES PATENT OFFICE 2,519,751

METHANOL OXIDATION CATALYSTS

Edmund Field, Wilmington, Del., assignor to E. I. du Pont de Nemours & Company, Wilmington, Del., a corporation of Delaware No Drawing. Application June 16, 1944, Serial No. 540,739

5 Claims. (Cl. 260—603)

This invention relates to the manufacture of formaldehyde by the oxidation of methanol in which improved metal phosphate catalysts are used. The invention in particular relates to catalysts containing molybdenum and phosphorus for the reaction.

An object of the present invention is to provide improved catalysts for the oxidation of methanol to formaldehyde. Another object is to provide suitable methods for preparing the catalysts. A further object is to provide new and improved phosphate catalysts for the reaction, which catalysts are promoted with molybdic oxide. Yet another object is to provide for the reaction catalysts of phosphorus and manganese, magnesium, cadmium, or the alkaline earth metals, promoted as designated in the above object and, in addition, promoted with a sodium hydrogen phosphate or potassium carbonate. Other objects and advantages of the invention will hereinafter appear.

The invention is conducted in accord with its broadest aspects by passing vaporized methanol and oxygen, air, or air diluted with an inert gas, into contact, under carefully controlled and known conditions, with a catalyst containing phosphorus, preferably as a phosphate of manganese, magnesium, cadmium, or an alkaline earth metal, promoted with molybdic oxide, which catalyst may contain, in addition, a mono or di alkali metal phosphate, or an alkali metal carbonate.

As examples of catalysts which have been found very effective for catalyzing the oxidation of methanol, the following are given, although it should be understood that the proportions of phosphorus and manganese, magnesium, cadmium, or an alkaline earth metal used to prepare the catalyst and the amount of promoters added to the catalyst may vary widely without departing from the scope of the invention. Furthermore, as will be appreciated from the ensuing remarks, it is not essential that the catalyst is in the form of a phosphate salt, for it may be prepared in a variety of ways. For example, the metal phosphate may be prepared separately by precipitation or by intimately mixing the desired proportions of the metal hydroxides, carbonates or other salts of volatile or unstable acids with one of the oxides or ammonium salts of phosphorus, and heating the mixture. The molybdenum promoter can be in introduced as the oxide or as a salt which breaks down to the oxide on heating or contrarywise, the metal phosphate and molybdate may be co-precipitated. When the mixing technique is employed, the promoters may be incorporated directly, if desired, or as an extra step. The alkali metal secondary promoter can be introduced as the mono- or di-hydrogen phosphate or as the carbonate. Parts in the examples are on a weight basis unless otherwise stated.

*Example A.*—Manganese phosphate was precipitated by addition of ammonium hydroxide with vigorous agitation to a solution of 505 grams of 85 phosphoric acid and 1613 grams of 75% manganese nitrate in 18 liters water. The phosphate was washed and dried in air. One quarter of the product, 330 g., was kneaded in a mortar with water and 89.1 g. ammonium molybdate, $(NH_4)_6Mo_7O_{24} \cdot 4H_2O$, to form a stiff paste. The paste was heated to 450° C., crushed to a powder and rekneaded with water and dried at 150°. The product was crushed to size for test. If desired, it may be powdered and pelleted. The final composition, in terms of atomic ratios, was:

$$1Mn—1P—0.3 Mo$$

*Example B.*—An atomic composition of $$1Mn—0.9P—0.2Mo$$

was prepared by kneading together with water 123 parts hydrated manganese acetate, 44 parts orthophosphoric acid, and 17.6 parts ammonium molybdate. The thick paste was ignited at 450° and the product crushed to size.

*Example C.*—Manganese phosphate was prepared as in Example A, and ignited to 450°. 355 parts of the ignited phosphate was kneaded with 88 parts ammonium molybdate and 8.9 parts $Na_2HPO_4 \cdot 12H_2O$, using sufficient water to produce a stiff paste. The paste was heated slowly to 450°, the resulting product crushed to size and then heated again to 520° before use.

*Example D.*—A catalyst was prepared exactly as in Example C, except that instead of the $Na_2HPO_4 \cdot 12H_2O$, 3.4 parts of $NaH_2PO_4 \cdot H_2O$ were employed.

*Example E.*—Magnesium phosphate was prepared by dissolving 77 parts of $Mg(NO_3)_2 \cdot 6H_2O$ in 1800 parts water, adding 32.3 parts of $H_3PO_4$ and finally adding ammonium hydroxide dropwise with stirring to a pH of 7.2 The precipitate was washed and heated to 450°. 84.5 parts of the ignited powder were kneaded with 26.4 parts of ammonium molybdate with sufficient water to make a stiff paste. The paste was heated to 450° C., powdered, rekneaded with water, dried at 150° and crushed to size of 14-20 mesh prior to use.

*Example F.*—Calcium phosphate was prepared by precipitation with ammonia from a solution of 236 parts $Ca(NO_3)_2 \cdot 4H_2O$ and 147 parts $H_3PO_4$ in 6000 parts water. The precipitate from the neutralized solution was washed, filtered and heated to 450° C. The phosphate was promoted by kneading 125 parts of the phosphate with 34.5 parts of ammonium molybdate in a porcelain mortar, using sufficient water to produce a thick paste. The paste was heated to 450° and crushed to size prior to use.

*Example G.*—In order to prepare cadmium phosphate, 309 parts of $Cd(NO_3)_2 \cdot 4H_2O$ and 184 parts of $H_2PO_4$ were dissolved in 6000 parts water. Ammonium hydroxide was added slowly with vigorous stirring to a pH of 7.0. The precipitate was washed by decantation, the product kneaded with water and 32 parts $(NH_4)_6Mo_7O_{24} \cdot 4H_2O$ to a smooth paste and heated to 450° and crushed to size.

*Example H.*—The catalyst in Example G was further promoted by kneading 147 parts of the ignited powder with 2.45 parts $Na_2HPO_4 \cdot H_2O$ and sufficient water to produce a paste. The catalyst was heated to 450° and crushed to size.

Particularly efficient catalysts for the oxidation of methanol to formaldehyde may contain, on an atomic weight ratio basis, in accord with the invention:

(1) from 3.0 to 0.5 atom of manganese, magnesium, cadmium, or an alkaline earth metal per atom of phosphorus;

(2) from 20.0 to 1.0 moles of metal phosphate per mole of molybdic acid; and (3) catalysts such as described under (1) and (2), prepared by the addition of from 0.002 to 0.05 mole of a mono- or a di-alkali metal phosphate or an alkali metal carbonate per atom of phosphorus.

The use of the above catalysts may be exemplified by the process in which methanol at a space velocity of 550 hrs.$^{-1}$ was oxidized with an inlet gas containing 8.4% oxygen and 91.6% nitrogen, the ratio of inlet gas to methanol being approximately 11 to 1. The reaction was conducted at a maximum temperature between 455 and 480° C. in a tubular converter charged with a 14 to 20 mesh catalyst described in Example C. The catalyst bed was approximately 7 inches deep, and formaldehyde was produced with a conversion of 90% or better.

While the above example illustrates operation with less than 10.9% oxygen in the inlet gas, the catalysts of this invention may likewise be used with inlet gas containing 21.9% oxygen. Moreover, the gas to methanol ratio may range from 6 to 1 on a molar basis up to, for example, 30 to 1. Space velocities vary over a wide range and are preferably held between 200 and 50,000 hrs.$^{-1}$ based on the methanol. Temperatures of the catalysts may range between 200 and 550° C. and are preferably held between 250 and 450° C. Under the preferred conditions, conversions to formaldehyde up to in the order of 94% are customarily obtained.

The catalysts are usually heated prior to use in order to facilitate handling and to eliminate fluctuations in composition which might result during the initial stages of a reaction if the catalyst is not heated to temperature prior to use. Moreover, the heating step makes it possible to form the catalyst into the size most suitable for the converter to be used. Accordingly, the catalyst may be heated during preparation to a temperature between 300 and 600° C. and preferably to slightly above that temperature at which it is to be used. It may then be crushed and screened to size or pelleted in a suitable pelleting machine.

The catalysts have been described as containing compounds of the elements without reference to their state of oxidation. This has been done for the sake of convenience, but in actual practice and under the conditions of methanol oxidation, a varying amount of normal and lower oxides, or even the metals themselves or compounds of the metals may and possibly do exist in the catalyst mass. If desired, the catalysts may be used with a carrier, such as silica gel, infusorial earth, pumice or the like.

In use, the catalyst is disposed in a suitable reaction converter provided with adequate means for removing the heat of the reaction, a mixture of methanol and air or other oxygen-containing gas is passed over the catalyst, and the reaction conducted at temperatures ranging between 200 and 500° C. Operation is generally at atmospheric pressure, although elevated or reduced pressure may be employed if desired. With catalysts of the type described, conversion of methanol is practically complete at optimum temperature levels, and the product is primarily formaldehyde with small amounts of carbon monoxide as the principal by-product. At lower temperatures some methanol may pass through the catalyst unchanged. In either case the formaldehyde is separated by usual methods and, if methanol is present, it is recovered and recycled.

The conditions for the oxidation of methanol to formaldehyde are all shown in the art, and it has been found that the catalysts of this invention will catalyze the reaction with excellent results, when working under conditions of time, temperature, concentration of vaporized alcohol in the mixture undergoing reaction at any suitable ratios of alcohol to oxygen, which conditions are already known in the art of catalytic oxidation of methanol to formaldehyde.

I claim:

1. In a process for the preparation of formaldehyde, the steps which comprise air oxidizing methanol at a temperature between 200 and 500° C. with a manganese phosphate catalyst containing on an atomic weight basis from 3.0 to 0.5 atom of manganese per atom of phosphorus.

2. The process of claim 1 in which the catalyst is promoted with molybdic acid.

3. The process of claim 1 in which the catalyst is promoted with molybdic acid and a salt of the group consisting of mono- and di-alkali metal phosphates.

4. In a process for the preparation of formaldehyde, the steps which comprise air oxidizing methanol at a temperature between 200 and 500° C. with a manganese phosphate catalyst promoted with molybdic acid and, on an atomic weight basis, from 3.0 to 0.5 atom of manganese per atom of phosphorus, from 20.0 to 1.0 moles of manganese phosphate per mole of molybdic acid and from 0.002 to 0.15 mole of a phosphate from the group consisting of monoand di-alkali metal phosphates per atom of phosphorus.

5. In a process for the preparation of formaldehyde, the steps which comprise air oxidizing methanol at a temperature between 200 and 500° C. with a catalyst consisting essentially of manganese, phosphorus molybdenum and combined oxygen, the first three elements having an atomic ratio basis of 1:1:0.3.

EDMUND FIELD.

REFERENCES CITED

The following references are of record in the file of this patent:

UNITED STATES PATENTS

| Number | Name | Date |
|---|---|---|
| 1,215,335 | Bosch et al. | Feb. 13, 1917 |
| 1,813,478 | Andrusson | July 7, 1931 |
| 1,845,555 | Pier et al. | Feb. 16, 1932 |
| 1,851,754 | Craver | Mar. 29, 1932 |
| 1,913,404 | Meharg | June 13, 1933 |
| 1,975,476 | Pier | Oct. 2, 1934 |
| 2,102,751 | Scheuermann et al. | Dec. 21, 1937 |
| 2,191,156 | Pier | Feb. 29, 1940 |
| 2,218,457 | Winans | Oct. 15, 1940 |
| 2,320,253 | Arnold | May 25, 1943 |

FOREIGN PATENTS

| Number | Country | Date |
|---|---|---|
| 788,533 | France | Oct. 11, 1935 |

OTHER REFERENCES

"Catalytic Oxidation of Organic Compounds"; Marek et al. (1932), pages 51, 319.

Mellor: "Comprehensive Treatise on Inorganic and Theoretical Chemistry" 1927; Longmans Green Co., vol. 2, pages 853 and 860.